United States Patent
Shibata et al.

(10) Patent No.: US 7,953,718 B2
(45) Date of Patent: May 31, 2011

(54) DATA PROCESSING APPARATUS, METHOD, AND PROGRAM

(75) Inventors: Yoshiaki Shibata, Kanagawa (JP); Takumi Yoshida, Kanagawa (JP); Katsumi Tahara, Tokyo (JP)

(73) Assignee: Sony Corporation, Tokyo (JP)

( * ) Notice: Subject to any disclaimer, the term of this patent is extended or adjusted under 35 U.S.C. 154(b) by 1170 days.

(21) Appl. No.: 10/475,870

(22) PCT Filed: Feb. 26, 2003

(86) PCT No.: PCT/JP03/02140
§ 371 (c)(1), (2), (4) Date: Oct. 24, 2003

(87) PCT Pub. No.: WO03/073426
PCT Pub. Date: Sep. 4, 2003

(65) Prior Publication Data
US 2004/0139065 A1 Jul. 15, 2004

(30) Foreign Application Priority Data
Feb. 28, 2002 (JP) .................................. 2002-054971

(51) Int. Cl.
*G06F 17/30* (2006.01)
(52) U.S. Cl. ........................................ 707/705; 707/609
(58) Field of Classification Search .................. 386/111, 386/54, 68; 713/176; 707/3, 609, 705
See application file for complete search history.

(56) References Cited

U.S. PATENT DOCUMENTS

| | | | |
|---|---|---|---|
| 5,479,299 A * | 12/1995 | Matsumi et al. | 386/54 |
| 5,963,909 A | 10/1999 | Warren et al. | |
| 6,100,788 A * | 8/2000 | Frary | 340/10.1 |
| 6,195,497 B1 * | 2/2001 | Nagasaka et al. | 386/200 |
| 6,519,105 B1 * | 2/2003 | Takayama | 360/55 |
| 6,611,394 B1 * | 8/2003 | Kato et al. | 360/69 |
| 6,741,793 B1 * | 5/2004 | Sugiyama | 386/68 |
| 7,289,717 B1 * | 10/2007 | McGrath et al. | 386/52 |
| 2002/0035664 A1 * | 3/2002 | Yates et al. | 711/111 |
| 2002/0181944 A1 * | 12/2002 | Kawahara et al. | 386/111 |
| 2003/0217273 A1 * | 11/2003 | McGrath et al. | 713/176 |

FOREIGN PATENT DOCUMENTS

EP   1 308 954   5/2003

(Continued)

OTHER PUBLICATIONS

Kawahara et al, "Information Recording Device and Method and Information Recording System", WO/2002/001565.*

(Continued)

*Primary Examiner* — Sheree Brown
(74) *Attorney, Agent, or Firm* — Frommer Lawrence & Haug LLP; William S. Frommer; Paul A. Levy

(57) ABSTRACT

A UMID extracting/embedding unit 10 extracts UMID data embedded in material data. A CPU 11 updates a generation indicated by generation data in the extracted UMID data to generate new generation data when processing accompanied by a deterioration of quality is applied to the material data such as recording to a database 8. The UMID extracting/embedding unit 10 embeds the new generation data in the material data.

19 Claims, 12 Drawing Sheets

FOREIGN PATENT DOCUMENTS

| | | |
|---|---|---|
| GB | 2 361 131 | 10/2001 |
| JP | 2 12138 | 1/1990 |
| JP | 5-109239 | 4/1993 |
| JP | 8-130712 | 5/1996 |
| JP | 2001-144945 | 5/2001 |
| JP | 2001-186399 | 7/2001 |
| JP | 2001-203971 | 7/2001 |
| JP | 2001-211420 | 8/2001 |
| JP | 2002-271744 | 9/2002 |
| WO | WO 96 24222 | 8/1996 |
| WO | WO 02 01565 | 1/2002 |

OTHER PUBLICATIONS

WO2002001565.*

Wilkinson J H and Cox M E: "Tools and Techniques for Globally Unique Content Identification" SMPTE Journal, vol. 109, No. 10, Oct. 2000, pp. 795-799, XP000969315 ISSN: 0036-1682.

Morgan O: "Wrappers and Metadata Sub Group [digital video standards]" IEE Colloquium on the EBU-SMPTE Task Force: Building an Infrastructure for Managing Compressed Video Systems, Dec. 5, 1997, pp. 5/1-5/7, XP006506105.

* cited by examiner

DATA PROCESSING APPARATUS, METHOD, AND PROGRAM

TECHNICAL FIELD

The present invention relates to a data processing apparatus able to easily identify the number of times by which content data to be processed has been subjected to processing accompanied by deterioration of quality in the past and a method of the same and a program of the same.

BACKGROUND ART

In video production, use of material data having a little history of processing (number of generations) among the material data is important for the production of a high quality final product (complete package data).

This is because, in almost all processing, intermediate material data produced in the process is temporarily recorded on a recording medium, so there are cases where the quality of the material deteriorates each time.

That is, when the material data is analog data needless to say, but also when it is digital data, if encoding (compressing) and decoding (decompressing) the material data with each write and read operation of the material data with respect to the recording medium as in an SDI (bit-serial digital interface) environment, the quality of the material data will definitely deteriorate.

For example, consider a case of processing certain original material data a plurality of times. If successively processing it and temporarily storing the intermediate material data on for example magnetic tape at every processing, the finally obtained complete package data will be copied the same number of times as the times of processing even with respect to parts not processed at all, so the quality of the entire complete package data will be greatly lowered.

Such a situation frequently occurs when production is by trial and error etc.

In the past, however, generation information of intermediate material data has not been managed at all or, even if it was managed, was separated from the material per se and manually managed, so generation information has not been effectively utilized in the production of the high quality complete package data.

On the other hand, in an environment where all material data used and generated in production of a series of complete package data is centrally managed, desirably a unique identifier is embedded in each material data and meta-data comprised of various types of information concerning the material data is stored in a database using the given identifier as a main search item.

Further, information on the history of processing which has been applied to for example certain material data has become an important item of such meta-data.

In such an environment, however, when the processing history information of certain material data is required, it is necessary to inquire at the database each time using the identifier provided as a search key.

When the material data is the original material, however, this means that no processing has been applied, so such an inquiry itself becomes useless.

DISCLOSURE OF THE INVENTION

The present invention was made in consideration with such a circumstance and has as an object thereof to provide a data processing apparatus able to easily identify the number of times by which material data has been subjected to processing accompanied by deterioration of quality in the past and a method of the same and a program of the same.

Another object of the present invention is to provide a data processing apparatus able to avoid useless reference to the processing history data showing the history of the content of the processing applied to the material data in the past when the processing history data is managed separately from the material data and a method of the same and a program of the same.

To attain the above, objects, a data processing apparatus of a first aspect of the invention comprises an extracting means for extracting generation data added to content data and a processing means for updating a generation indicated by the extracted generation data to generate new generation data when applying processing accompanied by a deterioration of quality to the content data and adding the new generation data to the content data.

A mode of operation of the data processing apparatus of the first aspect of the invention is as follows:

The extracting means extracts the generation data added to the content data.

Then, when the processing means applies processing accompanied by a deterioration of quality to the content data, it updates the generation indicated by the extracted generation data to generate new generation data and adds the new generation data to the content data.

In the data processing apparatus of the first aspect of the invention, preferably the processing means updates the generation indicated by the extracted generation data to generate new generation data and adds the new generation data to the content data when encoding the content data.

Further, in the data processing apparatus of the first aspect of the invention, preferably the processing means adds the new generation data to the content data, then encodes the content data to which the new generation data was added and writes the encoded content data into a recording medium.

Further, in the data processing apparatus of the first aspect of the invention, preferably provision is further made of a storage means for storing processing history data showing the history of the processing applied to the content data in the past, and the processing means refers to the corresponding processing history data stored in the storage means when deciding the processing accompanied by a deterioration of quality was applied to the content data in the past based on the extracted generation data.

A data processing method of a second aspect of the invention is a data processing method performed by a data processing apparatus comprising a first step of extracting generation data embedded in content data; a second step of updating a generation indicated by the generation data extracted in the first step to generate new generation data when processing accompanied by a deterioration of quality is applied to the content data; and a third step of adding the new generation data generated in the second step to the content data.

A program of a third aspect of the invention is a program executed by a data processing apparatus comprising a first routine of extracting generation data added to content data; a second routine of updating the generation indicated by the generation data extracted in the first routine to generate new generation data when processing accompanied by a deterioration of quality is applied to the content data; and a third routine of adding the new generation data generated in the second routine to the content data.

BEST MODE FOR CARRYING OUT THE INVENTION

Below, an explanation will be given of data processing systems according to embodiments of the present invention.

First Embodiment

Figure 1:
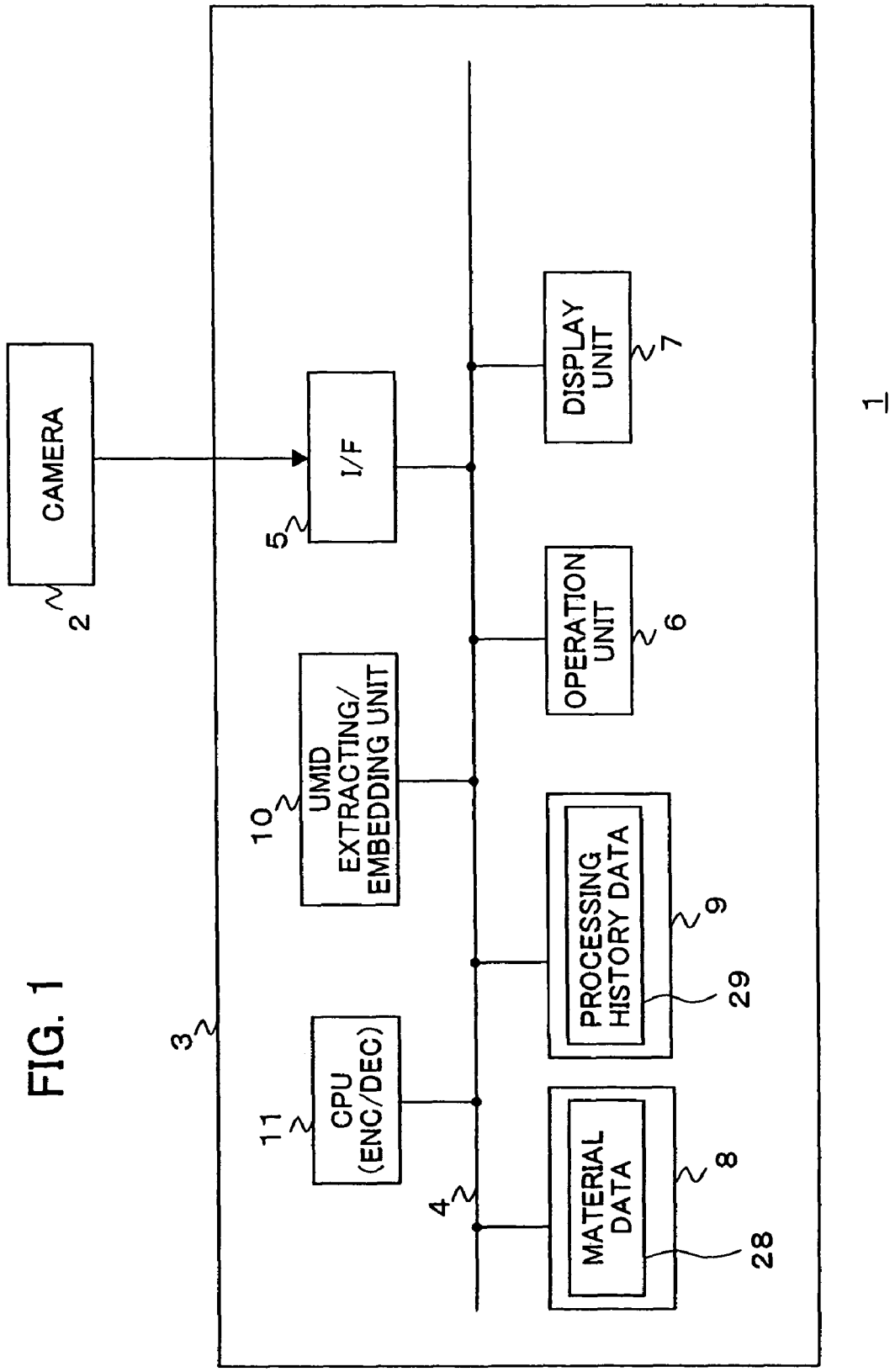
FIG. 1 is a view of the overall configuration of a data processing system of a first embodiment of the present invention.

FIG. 1 is a view of the overall configuration of a data processing system 1 of the present embodiment.

As shown in FIG. 1, the data processing system 1 has, for example a camera 2 and a data processing apparatus 3.

The camera 2 generates for example material data comprised of film data in accordance with a result of filming and outputs the same to the data processing apparatus 3.

The data processing apparatus 3 has, as shown in FIG. 1, for example an interface 5, an operation unit 6, a display unit 7, a database 8, a database 9, a UMID extracting/embedding unit 10, and a CPU (central processing unit) 11 connected via an internal bus 4.

The interface 5 receives as input the material data from the camera 2.

Here, the material data of the present embodiment corresponds to the content data of the present invention. The material data is for example video, audio, and other data.

The operation unit 6 is an operating means such as a keyboard or a mouse and outputs operation signals in accordance with an operation by the user to the CPU 11 via the internal bus 4.

The display unit 7 displays a screen in accordance with a display signal from the CPU 11. The display 7 displays for example a screen for editing the material data.

The database 8 stores material data 28 for editing or after processing (editing) in a searchable format.

The database 8 is comprised using for example a linear recording medium such as magnetic tape or a nonlinear recording medium such as an HDD (hard disk drive) or optical disk.

The material data is encoded and then recorded in the database 8 and is read out from the database 8 and decoded.

Here, the encoding is accompanied by processing deteriorating the quality of the material data.

The database 9 stores processing history data 29 indicating the processing history of the material data in a searchable format for every material data and is comprised using for example an HDD.

The UMID extracting/embedding unit 10 performs processing for extracting the UMID data (unique material identifier: meta-data) embedded in the material data and embedding (adding) the newly generated UMID data in the material data. The UMID data is embedded into the material data in a format by which the user cannot recognize the embedded UMID data as video and audio by using for example an electronic watermark technique when for example outputting the material data as video or audio.

Note that it is also possible to realize the UMID extracting/embedding unit 10 as part of the function of the CPU 11.

In the present embodiment, as part of the UMID data, generation data GEN_N indicating the number of times processing accompanied by deterioration of quality of image applied to material data having UMID data embedded therein in the past, i.e., in the present embodiment, the encoding before writing the data into the database 8 applied to the material data, is included.

The UMID data was standardized in the year 2000 by the international standardization organization the SMPTE (Society of Motion Picture and Television Engineers) and is a global unique identifier of material data.

Figure 2:
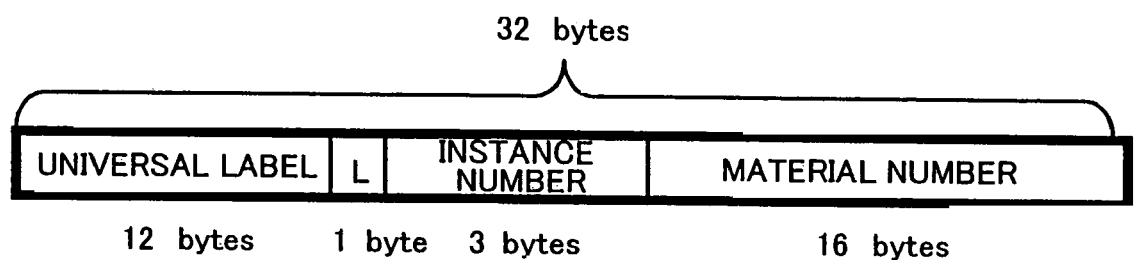
FIG. 2 is a view for explaining UMID data embedded in material data.

FIG. 2 is a view for explaining the UMID data.

As shown in FIG. 2, the UMID data is a 32-byte data string comprised of fields of a universal label, data length, instance number, and material number.

The universal label is a unique identifier indicating that data is UMID data. For example, in the case of video material, it is a value, by hexadecimal notation, "□06h 0A h 2B h 34h 01h 01h 01h 01h 01h 01h 01h 12h".

The data length indicates the length of the data continuing after that and is a fixed value of 13h in the UMID data.

The instance number is the field indicating if the material data having the UMID data embedded therein is the original material data or material data (derived material data) obtained as a result of applying certain processing to the original material data.

The instance number is "00h 00h 00h" in the case of the original material data and is a value other than that not in the case of the original material data.

Note that, the method of determination of the instance number is prescribed by the UMID standard. As an example, a method of assigning a locally unique value of 3 bytes to material data to which processing etc. was applied in the past (derived material data) using a centralized database so that it can be unambiguously identified in a certain determined region is prescribed.

The material number is the field wherein a unique value is globally given. This is the portion where the usage of the UMID data as the global unique material identifier is enabled.

The method of determination of the material number is also prescribed by the UMID standard. For example, the material number is determined by combining a MAC address able to globally uniquely identify an apparatus for generating and/or processing the material data and a starting time of the generation and/or processing of the material data.

In the present embodiment, by additionally defining the method of generation of a new value in the field of the instance number in the UMID data, the embedding of the generation data GEN_N mentioned above in the material data is realized.

Figure 3:
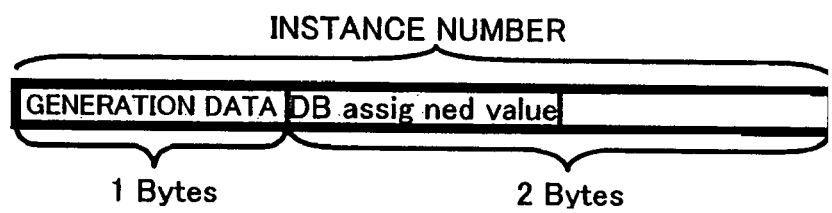
FIG. 3 is a view for explaining generation data defined in an instance number shown in FIG. 2.

Concretely, as shown in FIG. 3, the generation data GEN_N is assigned to an upper 1 byte of the field of the instance number, and the value for locally uniquely identifying the derived material data of the same generation by using the centralized database is assigned to the lower 2 bytes.

As the method of determination of the value of the lower 2 bytes of the instance number, a technique other than the technique of using the centralized database mentioned above can be used too so far as it is a method able to adequately secure local uniqueness in the region concerned. Concretely, it is also possible to determine the lower 2 bytes of the instance number by a method of assigning the value by manual input or a method of giving random numbers when there isn't so much derived material data.

The CPU 11 operates based on the predetermined program, and unificatedly controls the operation of the data processing apparatus 3 other than the generation and the processing of the material data.

The CPU 11 adds the generation data GEN_N in the instance number of the UMID data shown in FIG. 3 mentioned above to the material data when a new material data is generated.

Further, the CPU 11 updates the generation data GEN_N embedded in the material data whenever the material data is encoded and recorded in the database 8, that is, processing accompanied by a deterioration of quality is carried out.

Further, the CPU 11 performs the encoding (ENC) and the decoding (DEC) of the material data.

A detailed explanation will be given of the processing of the CPU 11 in relation to an example of the operation of the data processing system 1 shown below.

Below, an explanation will be given of the example of operation of the data processing system 1 shown in FIG. 1.

First Example of Operation

In this example of the operation, an explanation will be given of the case where the data processing apparatus 3 generates and processes the UMID data.

Figure 4:
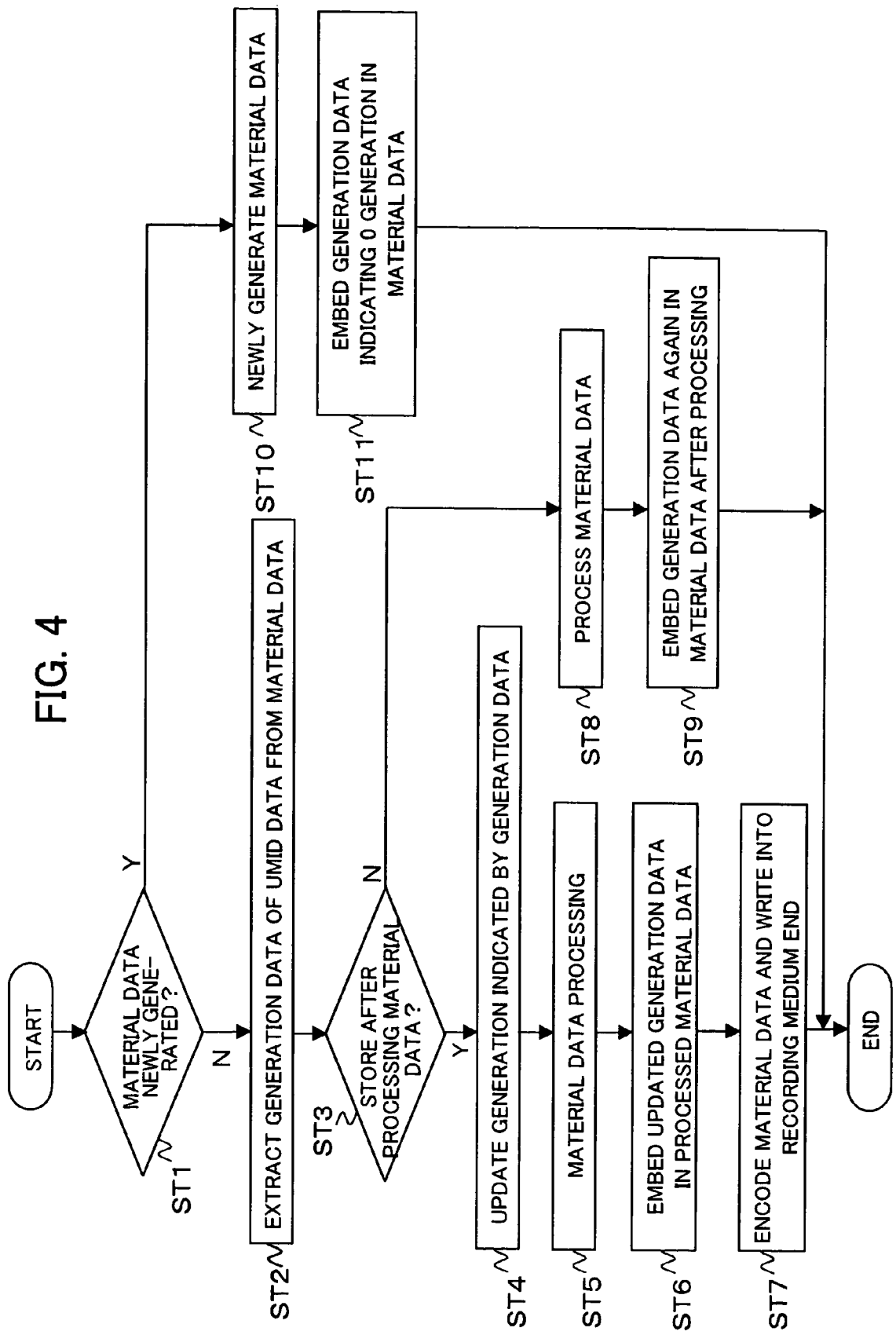
FIG. 4 is a flow chart for explaining a case where a data processing apparatus generates and processes UMID data in the data processing system shown in FIG. 1.

FIG. 4 is a flow chart for explaining the example of the operation.

Note that, in the present example of the operation, as the "processing accompanied by a deterioration of quality with respect to the content data" of the present invention, encoding carried out before writing the material data into the database 8 was exemplified. Note that, it is assumed that the deterioration of quality does not occur in the processing itself in the present example of the operation.

Step ST1:
The CPU 11 decides whether or not the material data is newly generated, proceeds to the processing of step ST10 when deciding that the material data is newly generated, and proceeds to the processing of step ST2 not in the former case (for example a case where the material data which has been already generated is processed).

Step ST2:
The UMID extracting/embedding unit 10 extracts the UMID data embedded in the material data to be processed under the control of the CPU 11.

Step ST3:
The CPU 11 decides whether or not the material data is to be temporarily recorded in a recording medium such as magnetic tape of for example the database 8 after processing the material data to be processed, proceeds to the processing of step ST4 when deciding that the material data is to be recorded, while proceeds to the processing of step ST8 when not deciding so.

Step ST4:
The CPU 11 generates the generation data GEN_N indicating a generation increased by one from the generation indicated by the generation data GEN_N in the UMID data extracted at step ST2.

Step ST5:
The CPU 11 performs processing such as cutting, wiping, or inserting a telop for the material data to be processed.

Step ST6:
The UMID extracting/embedding unit 10 receives as input the material data processed at step ST5 and the UMID data updated in the generation data GEN_N at step ST4 under the control of the CPU 11 and performs processing for embedding the UMID data in the material data.

Step ST7:
The UMID extracting/embedding unit 10 encodes the material data having the UMID data embedded therein under the control of the CPU 11.

Then, the UMID extracting/embedding unit 10 temporarily records the above encoded material data in the database 8.

Step ST8:
The CPU 11 performs processing such as cutting, wiping, and telop insertion on the material data to be processed.

Step ST9:
The UMID extracting/embedding unit 10 receives as input the material data processed at step ST7 and the UMID data extracted at step ST2 under the control of the CPU 11 and performs processing for embedding the UMID data in the material data.

Thereafter, the material data is output from for example the interface 5 to the other apparatus:

Note that, it is also possible if the CPU 11 does not perform the processing of step ST2, but performs processing of steps ST8 and ST9 in a case where temporary recording in the recording medium is not carried out after the processing of the material data and a case where the UMID data of the material data is not destroyed by the processing.

Further, when the material data is not processed, but recorded in a recording medium such as the database 8, deterioration of quality accrues due to the encoding at the time of the recording, so the CPU 11 records the material data in the recording medium after updating the generation data GEN_N.

Step ST10:
The CPU 11 generates new material data.

Step ST11:
The CPU 11 generates the UMID data indicating the generation data GEN_N indicating the 0 generation in the upper 1 byte of the field of the instance number.

Then, the UMID extracting/embedding unit 10 embeds the generated UMID data in the newly generated material data under the control of the CPU 11.

Thereafter, the generated material data is processed by the CPU 11.

Further, when the generated material data is recorded in the recording medium, after updating the generation data GEN_N, it is recorded in the recording medium.

Note that, in the above example of the operation, as the processing accompanied by a deterioration of quality of the present invention, the encoding performed at the time of recording onto the recording medium was exemplified, but even if recording onto the recording medium is not entailed, when deterioration of quality occurs due to the processing, the generation data GEN_N after updating is embedded in the material data after the processing without regard as to recording onto the recording medium.

Second Example of Operation

Figure 5:
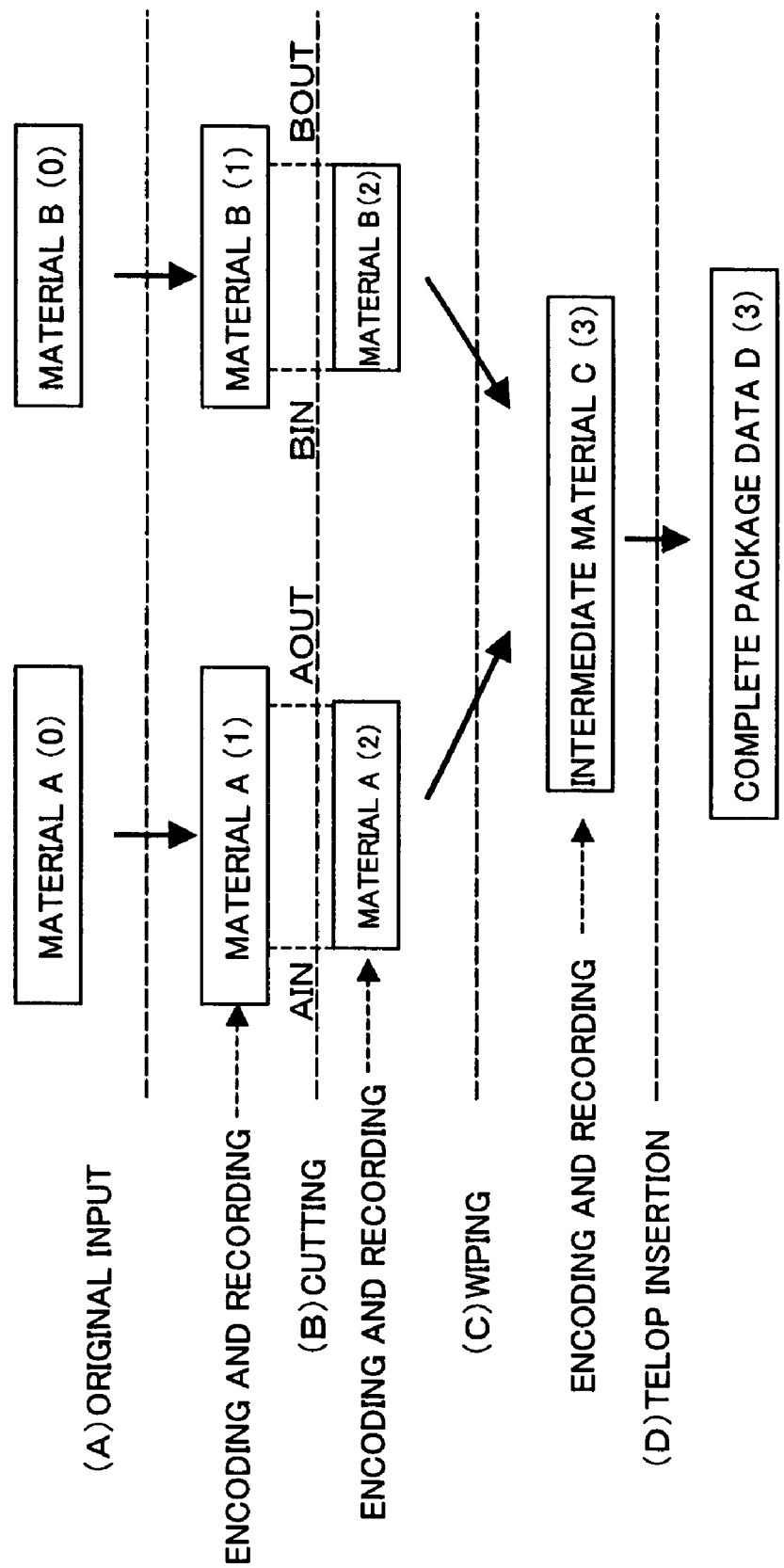
FIG. 5 is a view for explaining processing of generating complete package data by cutting, wiping, and inserting a telop for 0-generation material data in the data processing system shown in FIG. 1.

In this example of the operation, for example, as shown in FIG. 5, an explanation will be given of a case where third generation complete package data D(3) is generated by performing the cutting, wiping, and telop insertion and the temporary recording onto the recording medium one after another for material data (original material data) A(0) and B(0) of the 0 generation input from the camera 2.

In FIG. 5, where n is a positive integer, material data A(n), B(n), C(n), and D(n) indicate material data A, B, C, and D of n generations.

Figure 6:
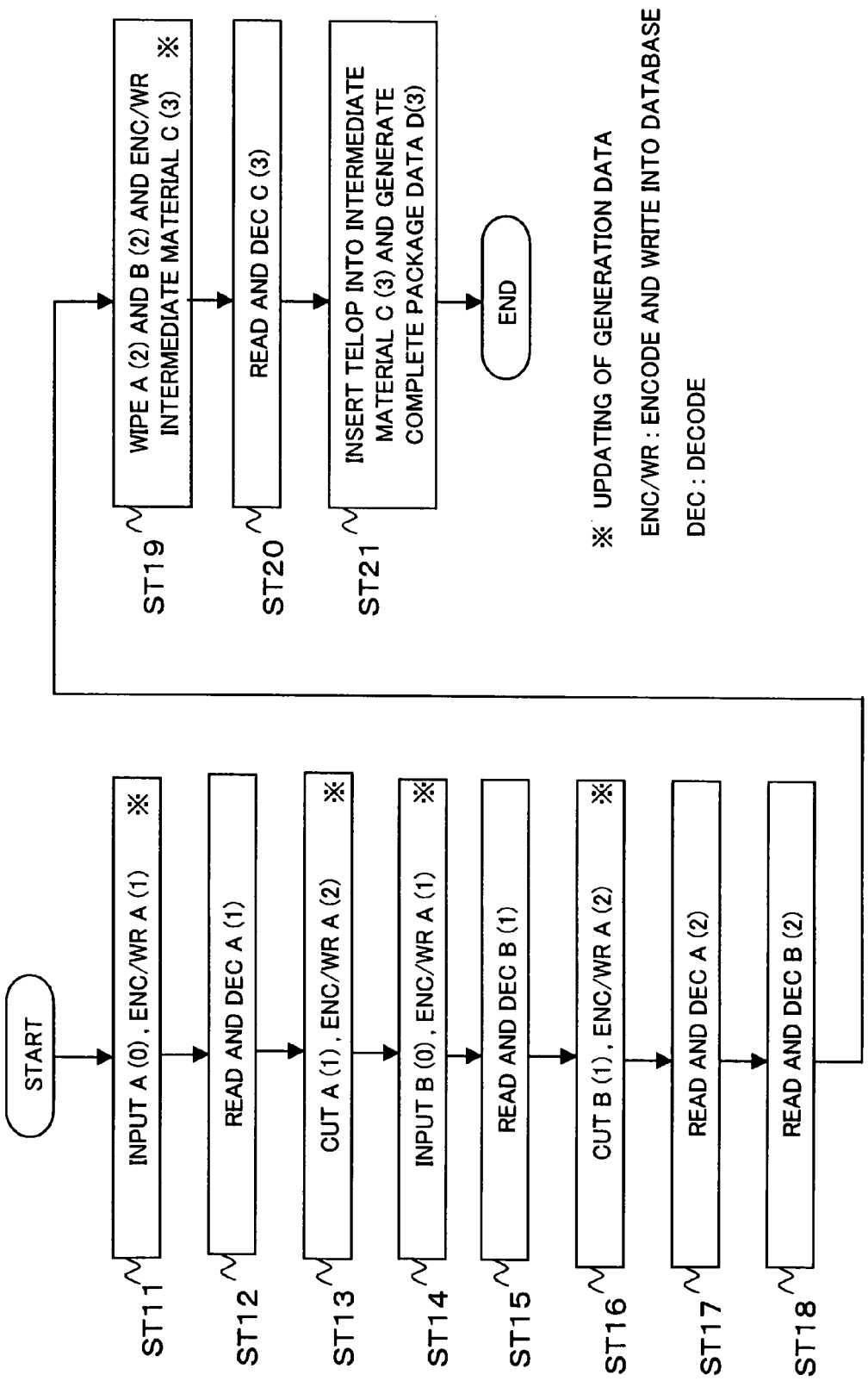
FIG. 6 is a flow chart for explaining the processing shown in FIG. 5.

FIG. 6 is a view for explaining examples of the operation.

Step ST11:

Under the control of the CPU 11, the material data A(0) comprised of the original material data generated by the camera 2 is input via the internal bus 4. Then, the CPU 11 generates the UMID data including the generation data GEN_N indicating first generation, and the UMID extracting/embedding unit 10 embeds this in the material data A(0) and generates the material data A(1).

Then, the CPU 11 encodes the material data A(1) and writes the same into the database 8.

Step ST12:

The CPU 11 reads out the material data A(1) from the database 8 and decodes it.

Step ST13:

As shown in FIG. 5, the CPU 11 cuts the material data A(1) read out and decoded at step ST12 using an Ain point and an Aout point as the standard to generate the material data A(1).

The CPU 11 updates the generation data GEN_N in the UMID data extracted from the material data A(1) according to the routines of ST1 to ST6 explained by using FIG. 4 and embeds the UMID data including the generation data GEN_N indicating the second generation in the material data A(1) to generate the material data A(2).

Then, the CPU 11 encodes the material data A(2) and writes the same into the database 8.

Step ST14:

Under the control of the CPU 11, the material data B(0) comprised of the original material data generated by the camera 2 is input via the internal bus 4. Then, the CPU 11 generates the UMID data including the generation data GEN_N indicating the first generation, and the UMID extracting/embedding unit 10 embeds this in the material data B(0) and generates the material data B(1).

Then, the CPU 11 encodes the material data B(1) and writes the same into the database 8.

Step ST15:

The CPU 11 reads out the material data B(1) from the database 8 and decodes the same.

Step ST16:

As shown in FIG. 5, the CPU 11 performs the cutting of the material data B(1) read out and decoded at step ST15 using a Bin point and a Bout point as the standard and generates the material data B(1).

The CPU 11 updates the generation data GEN_N in the UMID data extracted from the material data B(1) according to the routines of ST1 to ST6 explained by using FIG. 4 and embeds the UMID data including the generation data GEN_N indicating the second generation in the material data B(1) to generate the material data B(2).

Then, the CPU 11 encodes the material data B(2) and writes the same into the database 8.

Note that the sequences of the processing of steps ST11 to ST13 and the processing of steps ST14 to ST16 may be reversed. The steps can be carried out in parallel too.

Step ST17:

The CPU 11 reads out the material data A(2) written at step ST13 from the database 8 and decodes the same.

Step ST18:

The CPU 11 reads out the material data B(2) written at step ST16 from the database 8 and decodes the same.

Step ST19:

The CPU 11 wipes the material data A(2) read out and decoded at step ST17 and the material data B(2) read out and decoded at step ST18 to generate intermediate material data C(2).

The CPU 11 updates the generation data GEN_N in the UMID extracted from the material data A(2) and B(2) according to the routines of ST1 to ST6 explained by using FIG. 4, embeds the UMID data including the generation data GEN_N indicating the third generation in the intermediate material data C(2), and generates an intermediate material data C(3).

Then, the CPU 11 encodes the intermediate material data C(3) and writes the same into the database 8.

Step ST20:

The CPU 11 reads out the intermediate material data C(3) written at step ST19 from the database 8 and decodes the same.

Step ST21:

The CPU 11 applies telop processing to the intermediate material data C(3) read out and decoded at step ST20 and generates complete package data D(3).

Here, telop processing means the processing of embedding a predetermined image etc. by a method such a superimposition.

The above example of the operation is carried out in accordance with the operation of the operation unit 6 shown in FIG. 1 by the user and carried out in a case where the complete package data is produced by trial and error, for example, the flow of the entire video is constructed and observed in order to confirm the optimum insertion location of the telop.

Third Example of Operation

In this example of the operation, an explanation will be given of a case where the processing history data 29 of the designated material data is displayed in accordance with for example an instruction from the user during the editing of the material data.

Figure 7:
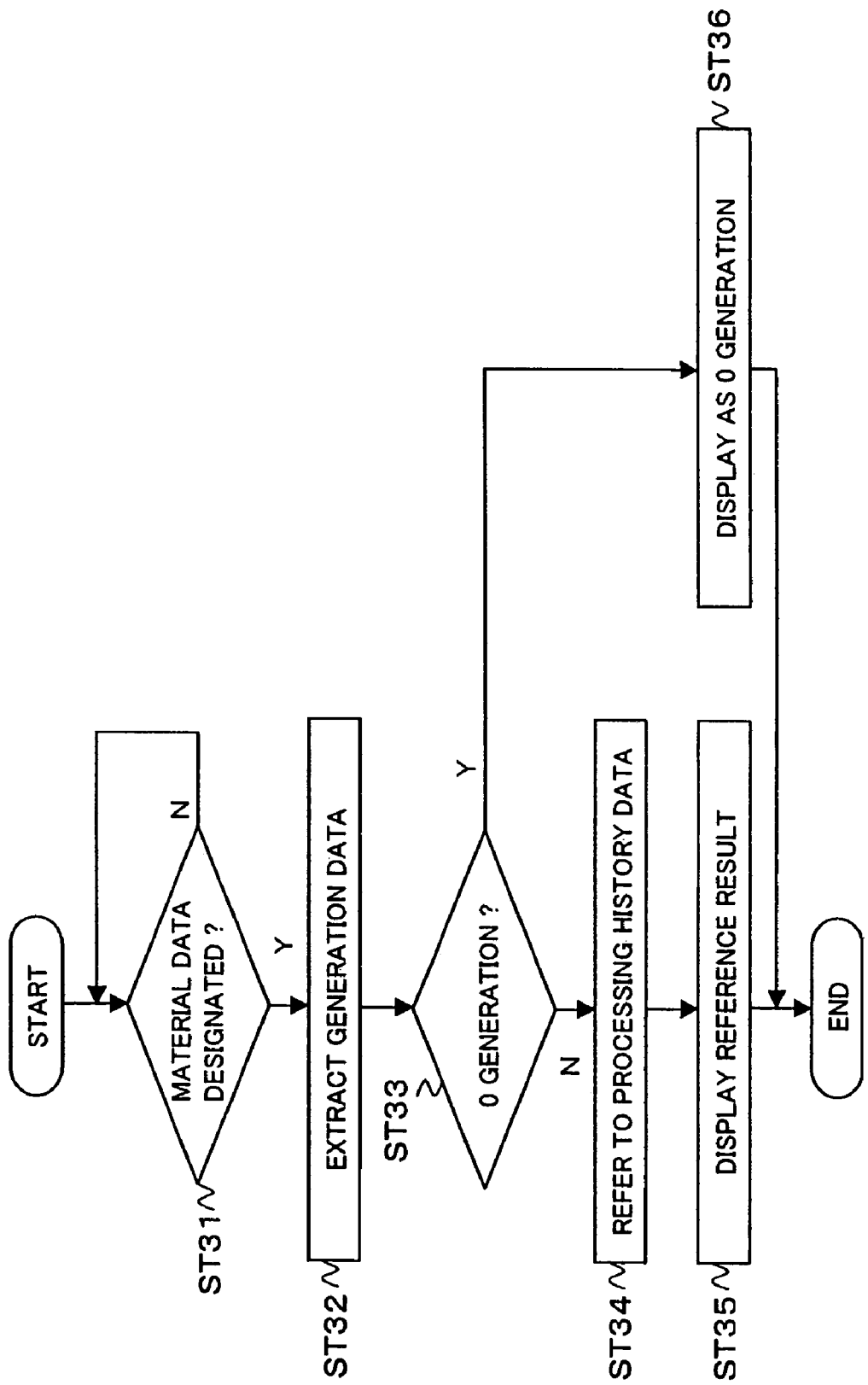
FIG. 7 is a flow chart for explaining a case of displaying for example processing history data of material data designated in accordance with an instruction from a user during editing of the material data in the data processing system shown in FIG. 1.

FIG. 7 is a flow chart for explaining the example of the operation.

Step ST31:

For example, the user operates the operation unit 6 and designates the material data on the screen of the display unit 7.

Step ST32:

The CPU 11 identifies the material data designated at step ST31 and extracts the generation data GEN_N in the UMID data embedded in the identified material data.

Step ST33:

The CPU 11 decides whether or not the generation data GEN_N extracted at step ST32 indicates the 0 generation, proceeds to the processing of step ST36 when deciding that it indicates the 0 generation, while proceeds to the processing of step ST34 when not deciding so.

Step ST34:

The CPU 11 reads out the processing history data 29 corresponding to the material data from the database 9 based on the lower 2 bytes shown in FIG. 3 of the instance number of the UMID data extracted at step ST32.

The processing history data 29 indicates the history of the cutting, wiping, telop insertion, etc. carried out in the past with respect to the material data.

Step ST35:

The CPU 11 outputs the processing history data 29 read out at step ST34 to the display unit 7 to display it.

Step ST36:

The CPU 11 makes the display unit 7 display a screen indicating the 0 generation.

In this way, in the data processing system 1, based on the generation data GEN_N of the designated material data, when the material data is the original material data, the database 9 is not accessed. By this, the processing load of the data processing system 1 can be lightened, and the processing time is shortened.

Note that, in the above embodiment, the case where the processing history data was simply displayed was exemplified, but it is also possible even if the CPU 11 automatically performs the editing etc. of the material data according to a rule determined in advance based on the processing history data.

Second Embodiment

Figure 8:
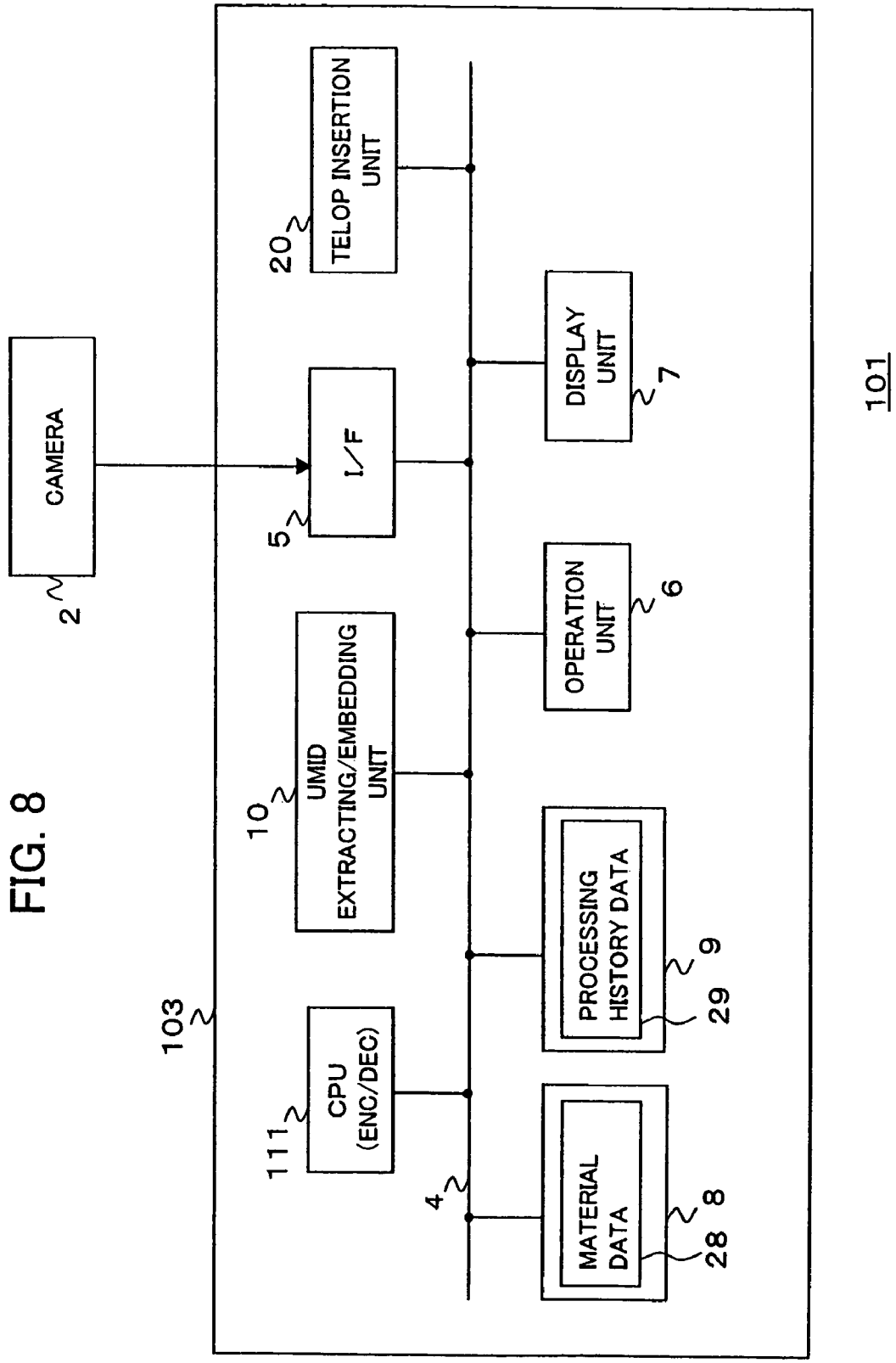
FIG. 8 is a view of the overall configuration of a data processing system of a second embodiment of the present invention.

FIG. 8 is a view of the overall configuration of a data processing system 101 of the present embodiment.

As shown in FIG. 8, the data processing system 101 has for example a camera 2 and a data processing apparatus 103.

In FIG. 8, components given the same notations as those of FIG. 1 are basically the same as those explained in the first embodiment.

The data processing apparatus 103 has, as shown in FIG. 8, for example an interface 5, an operation unit 6, a display unit 7, a database 8, a database 9, a UMID extracting/embedding unit 10, a telop insertion unit 20, and a CPU 111 connected via an internal bus 4.

The telop insertion unit 20 is hardware for performing the telop processing for example for two material data input via the internal bus 4 to generate new material data and outputting this to the internal bus 4.

The CPU 111 is basically the same as the CPU 11 of the first embodiment, but further performs the control of the telop insertion unit 20.

Below, an explanation will be given of the example of the operation of the data processing system 101 shown in FIG. 8.

In the example of the operation, for example, similar to the case mentioned above by using FIG. 5, an explanation will be given of a case of performing cutting, wiping, and telop insertion for the 0 generation material data (original material data) A(0) and B(0) input from the camera 2 to generate the complete package data.

Figure 9:
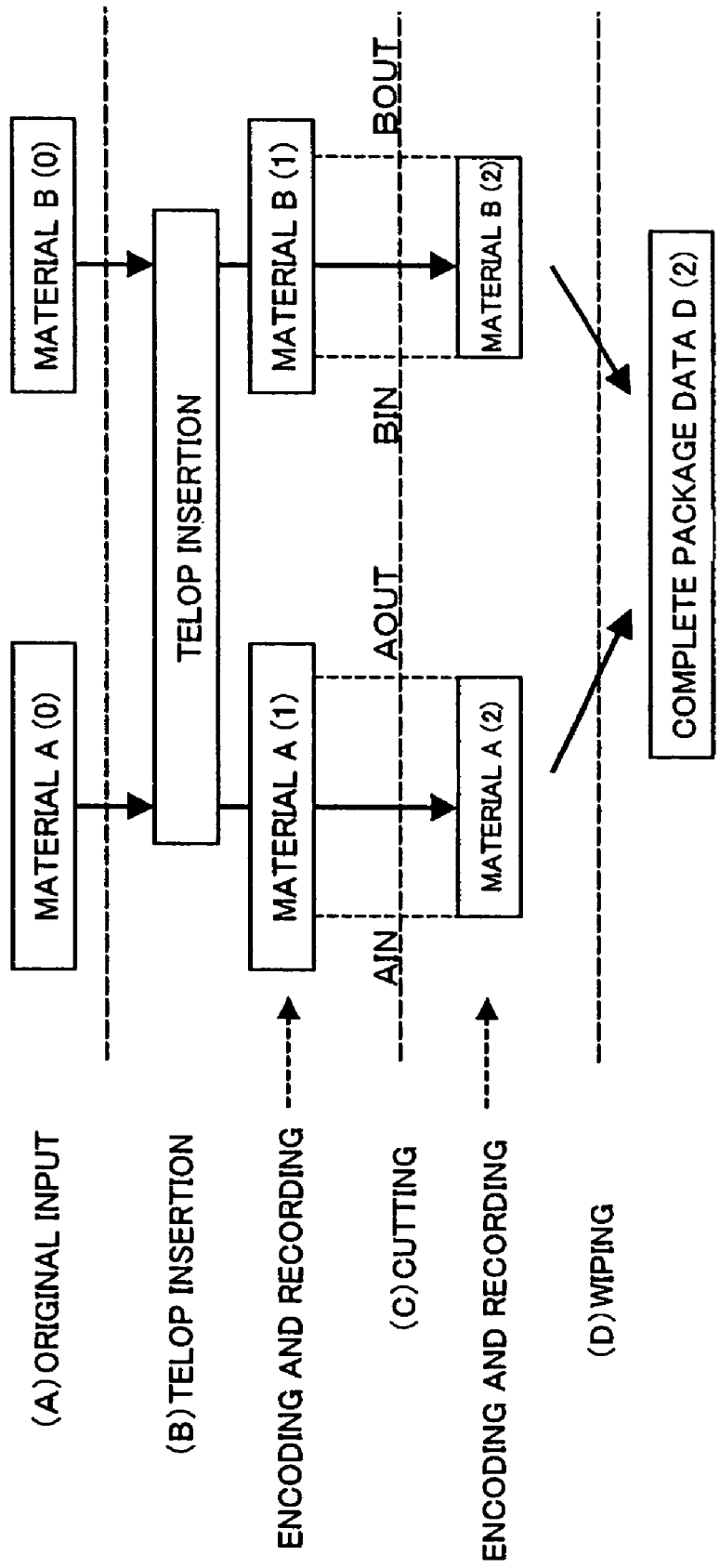
FIG. 9 is a view for explaining processing for cutting, wiping, and inserting telops for 0-generation material data for generating complete package data in the data processing system shown in FIG. 8.

In this case, as shown in FIG. 9, by inserting the telop to be written into the database 8 into the material data A(0) and B(0) and then writing it into the database 8 and thereafter performing the cutting and the wiping, the second generation complete package data D(2) is generated.

Figure 10:
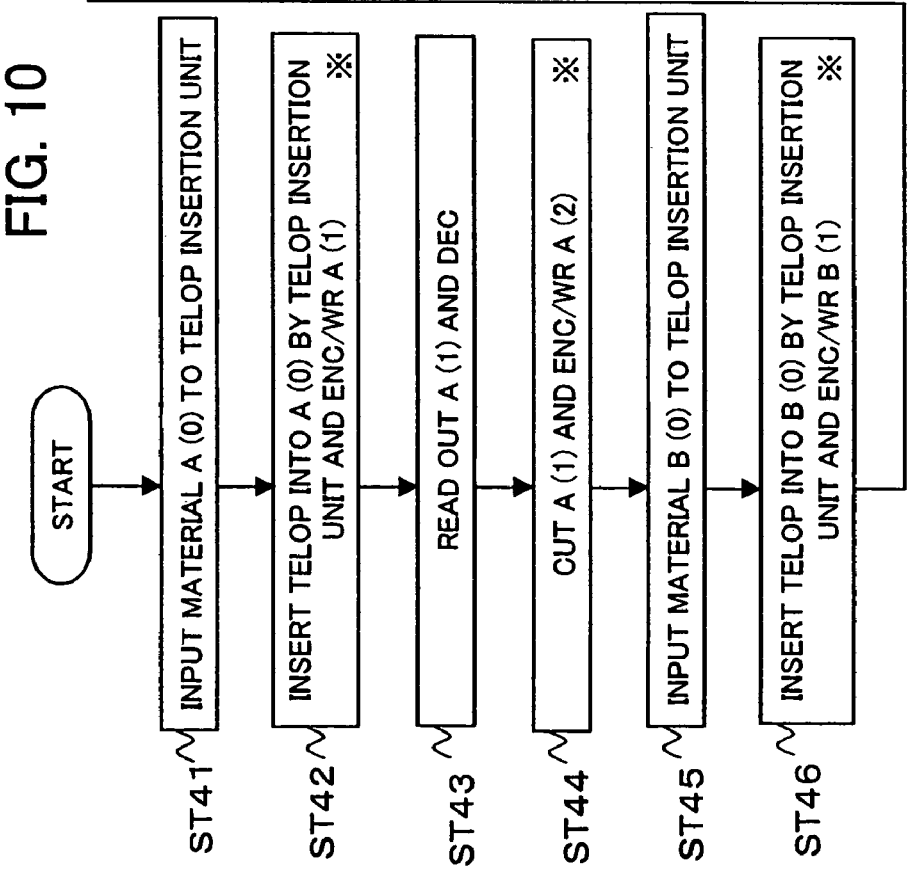
FIG. 10 is a flow chart for explaining the processing shown in FIG. 9.

FIG. 10 is a view for explaining the example of the operation.

Step ST41:

The material data A(0) generated by the camera 2 is input to the CPU 111. The CPU 111 generates the UMID data including the generation data GEN_N indicating the 0 generation.

Then, under the control of the CPU 111, the UMID extracting/embedding unit 10 embeds the generated UMID data in the material data A(0) and then outputs the material data A(0) to the telop insertion unit 20.

Step ST42:

The telop insertion unit 20 inserts the telop into the material data A(0) input at step ST41.

The CPU 111 updates the UMID data of the material data A(0) to generate the UMID data including the generation data GEN_N indicating the first generation, and the UMID extracting/embedding unit 10 embeds this in the material data A(0) to generate the material data A(1).

Then, the CPU 111 encodes the material data A(1) and writes the same into the database 8.

Step ST43:

The CPU 111 reads out the material data A(1) from the database 8 and decodes this.

Step ST44:

The CPU 111 performs the cutting of the material data A(1) read out at step ST43 using the Ain point and the Aout point as a standard.

Further, the CPU 111 updates the generation data in the UMID data extracted from the material data A(1) for which the cutting was carried out according to the routines of ST1 to ST6 explained by using FIG. 4 and embeds the UMID data including the generation data indicating the second generation to generate the material data A(2).

Then, the CPU 111 encodes the material data A(2) and writes it into the database 8.

Step ST45:

The material data B(0) generated by the camera 2 is input to the CPU 111. The CPU 111 generates the UMID data including the generation data GEN_N indicating the 0 generation.

Then, under the control of the CPU 111, after the UMID extracting/embedding unit 10 embeds the generated UMID data in the material data B(0), the material data B(0) is output to the telop insertion unit 20.

Step ST46:

The telop insertion unit 20 inserts the telop into the material data B(0) input at step ST41.

The CPU 111 updates the UMID data of the material data B(0) to generate the UMID data including the generation data GEN_N indicating the first generation, and the UMID extracting/embedding unit 10 embeds this in the material data B(0) to generate the material data B(1).

Then, the CPU 111 encodes the material data B(1) and writes it into the database 8.

Step ST47:

The CPU 111 reads out the material data B(1) from the database 8 and decodes this.

Step ST48:

The CPU 111 performs the cutting of the material data B(1) read out at step ST43 using the Bin point and the Bout point as a standard.

Further, the CPU 111 updates the generation data in the UMID data extracted from the material data B(1) for which the cutting was carried out according to the routines of ST1 to ST6 explained by using FIG. 4 and embeds the UMID data including the generation data indicating the second generation to generate the material data B(2).

Then, the CPU 111 encodes the material data B(2) and writes it into the database 8.

Step ST49:

The CPU 111 reads out the material data A(2) from the database 8.

Step ST50:

The CPU 111 reads out the material data B(2) from the database 8.

Step ST51:

The CPU 111 performs wiping for the material data A(2) read out at step ST49 and the material data B(2) read out at step ST50 to generate new material data D(2).

As mentioned above, according to the data processing system 101, by switching the sequences of the processing with respect to the 0-generation material data A(0) and B(0) and, at the same time, providing the telop insertion unit 20 as dedicated hardware for the telop processing, the number of temporary recordings to the database 8 is reduced in comparison with the case explained by using FIG. 5 and the second generation complete package data can be obtained.

Namely, the telop is inserted at an intermediate location of cut material data, therefore, even if the telop is inserted preceding cutting and then the required portion is cut out, the complete package data obtained as the result becomes a higher quality even though the content is the same.

Third Embodiment

Figure 11:
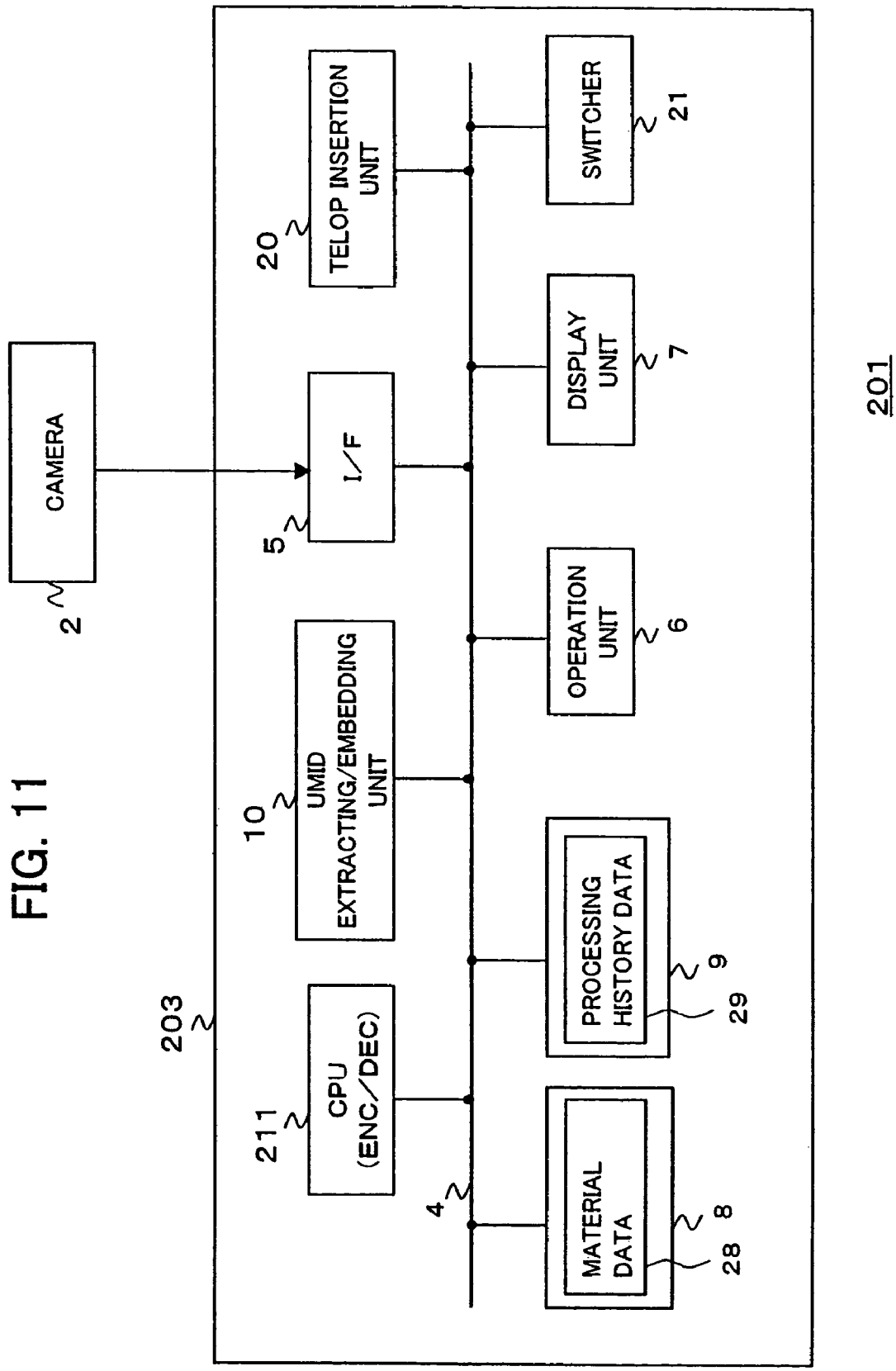
FIG. 11 is a view of the overall configuration of a data processing system of a third embodiment of the present invention.

FIG. 11 is a view of the overall configuration of a data processing system 201 of the present embodiment.

As shown in FIG. 11, the data processing system 201 has for example a camera 2 and a data processing apparatus 203.

In FIG. 11, components given the same notations as those of FIG. 1 are basically the same as those explained in the first embodiment.

The data processing apparatus 203 has, as shown in FIG. 11, for example an interface 5, an operation unit 6, a display unit 7, a database 8, a database 9, a UMID extracting/embedding unit 10, a telop insertion unit 20, a switcher 21, and a CPU 111 connected via an internal bus 4.

The telop insertion unit 20 is hardware for example for telop processing for two material data input via the internal bus 4 to generate new material data and outputting this to the internal bus 4 similar to the case of the second embodiment.

The switcher 21 is for example hardware for performing the wiping by switching two material data input via the internal bus 4 at a predetermined timing and outputting the same to the internal bus 4.

The CPU 111 is basically the same as the CPU 11 of the first embodiment, but further controls the telop insertion unit 20 and the switcher 21.

Below, an explanation will be given of an example of the operation of the data processing system 201 shown in FIG. 11.

In the example of the operation, for example, an explanation will be given of the case where the cutting, wiping, and telop insertion are carried out for the 0-generation material data (original material data) A(0) and B(0) input from the camera 2 and the complete package data is generated similar to the case mentioned above by using FIG. 5.

Figure 12:
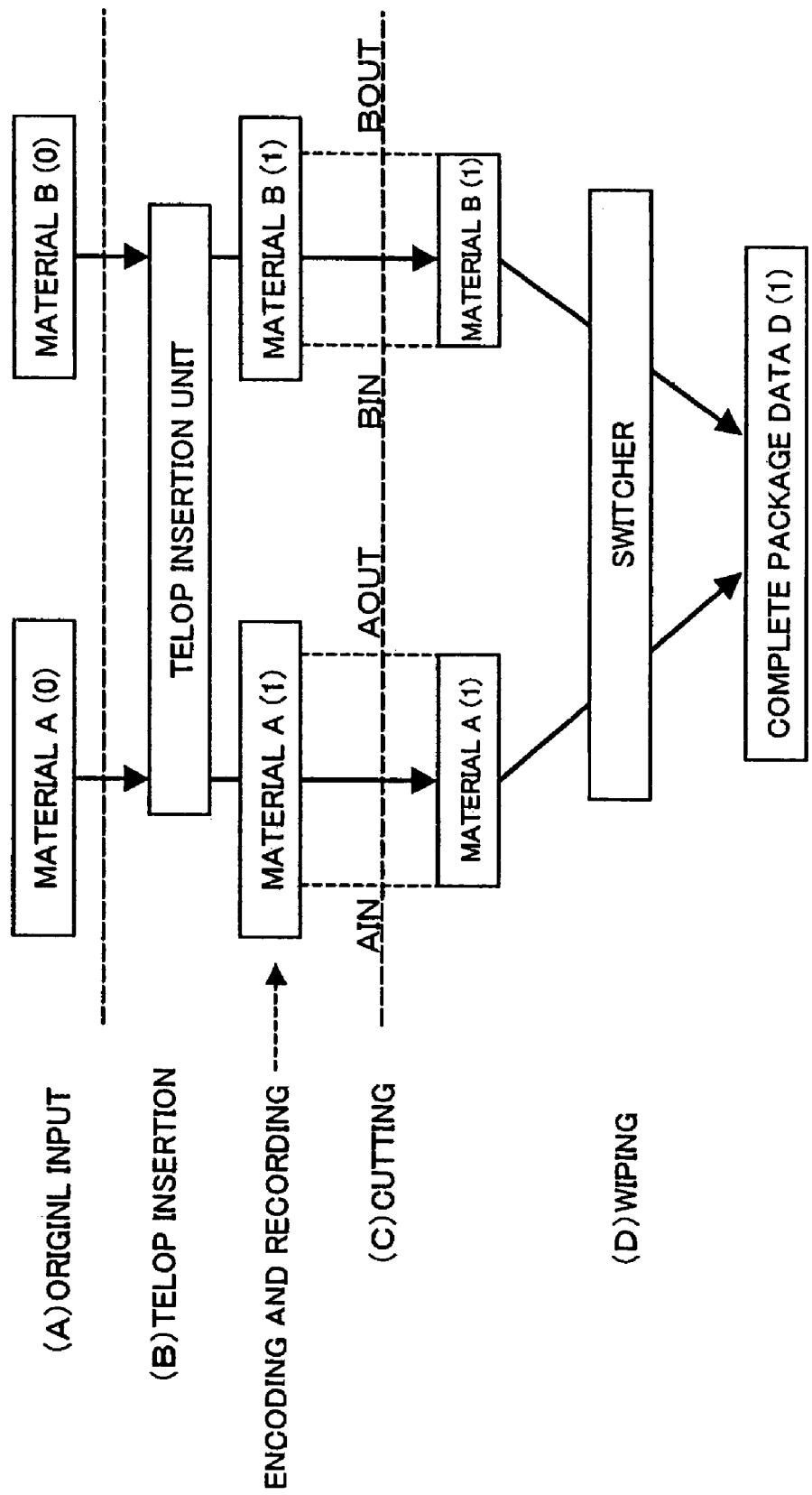
FIG. 12 is a view for explaining processing for cutting, wiping, and inserting telops for 0-generation material data for generating complete package data in the data processing system shown in FIG. 11. processing of generating the complete

In this case, as shown in FIG. 12, by performing the telop insertion by using the telop insertion unit 20 preceding the cutting of the material data A(0) and B(0) and, at the same time, performing the wiping at the switcher 21 by using the cut material data A(1) and B(1) similar to the case of the second embodiment, the first generation complete package data D(1) is generated.

Figure 13:
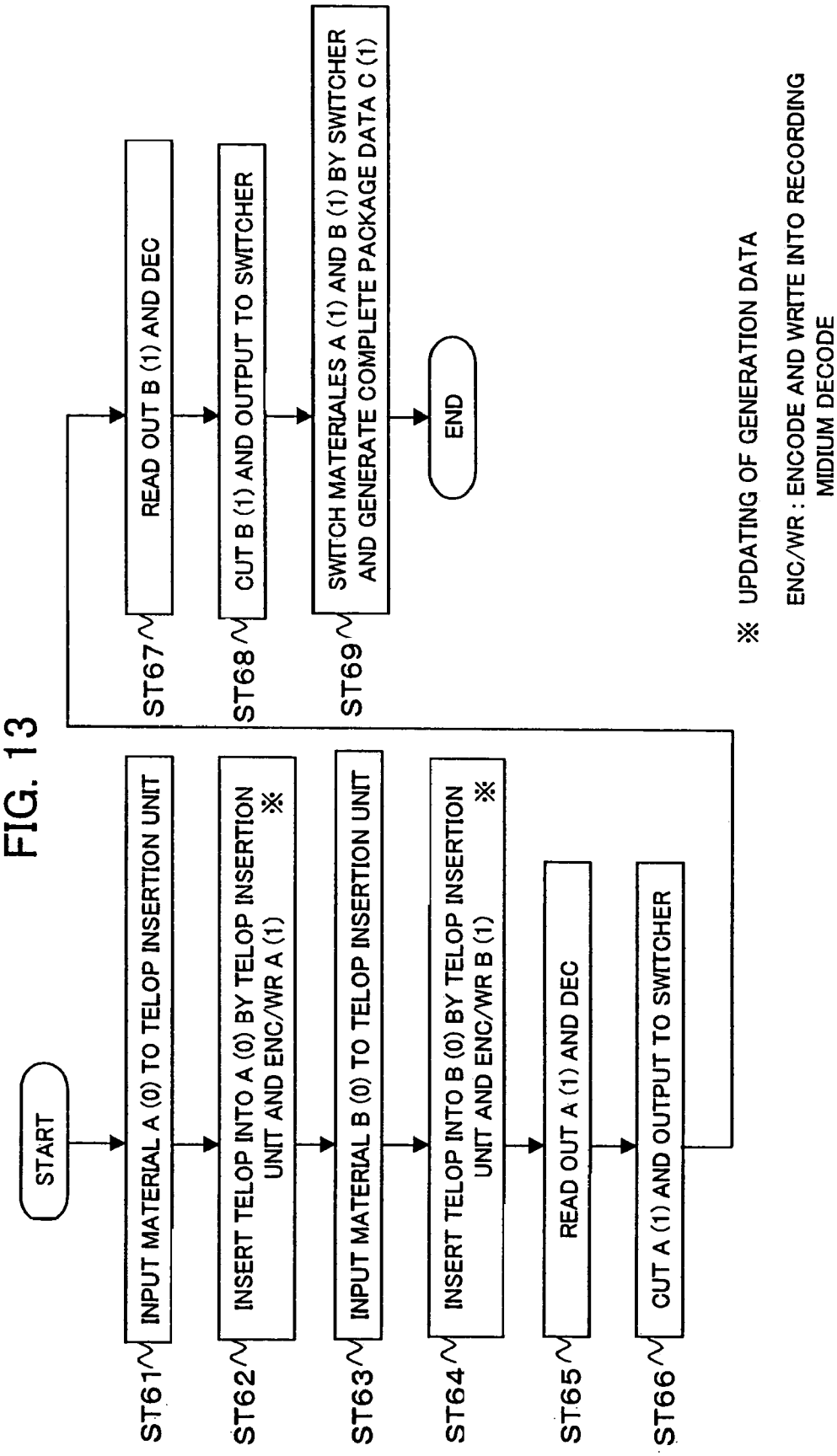
FIG. 13 is a flow chart for explaining the processing shown in FIG. 12.

FIG. 13 is a view for explaining the example of the operation.

Step ST61:

The material data A(0) generated by the camera 2 is input to the CPU 211, and UMID data including the generation data GEN_N indicating the 0 generation is generated by the CPU 211.

Then, under the control of the CPU 211, the UMID extracting/embedding unit 10 embeds the generated UMID data in the material data A(0), then outputs the material data A(0) to the telop insertion unit 20.

Step ST62:

The telop insertion unit 20 inserts the telop in the material data A(0) input at step ST61.

The CPU 211 updates the UMID data of the material data A(0) to generate the UMID data including the generation data GEN_N indicating the first generation, and the UMID extracting/embedding unit 10 embeds this in the material data A(0) to generate the material data A(1).

Then, the CPU 211 encodes the material data A(1) and writes it in the database 8.

Step ST63:

The material data B(0) generated by the camera 2 is input to the CPU 211. The CPU 211 generates the UMID data including the generation data GEN_N indicating the 0 generation.

Then, under the control of the CPU 211, the UMID extracting/embedding unit 10 embeds the generated UMID data in the material data B(0), then outputs the material data B(0) to the telop insertion unit 20.

Step ST64:

The telop insertion unit 20 inserts the telop in the material data B(0) input at step ST63.

The CPU 211 updates the UMID data of the material data B(0) and generates the UMID data including the generation data GEN_N indicating the first generation, and the UMID extracting/embedding unit 10 embeds this in the material data B(0) to generate the material data B(1).

Then, the CPU 211 encodes the material data B(1) and writes it into the database 8.

Step ST65:

The CPU 211 reads out the material data A(1) from the database 8 and decodes this.

Step ST66:

The CPU 211 cuts the material data A(1) decoded at step ST65 using the Ain point and the Aout point as a standard and outputs the same to the switcher 21.

Step ST67:

The CPU 211 reads out the material data B(1) from the database 8 and decodes this.

Step ST68:

The CPU 211 cuts the material data B(1) decoded at step ST67 using the Bin point and the Bout point as a standard and outputs the same to the switcher 21.

Step ST69:

The switcher 21 performs the wiping by switching the output timing for the material data A(1) input at step ST66 and the material data B(1) input at step ST68 to generate the complete package data D(1).

As mentioned above, according to the data processing system 201, the first generation complete package data can be generated. By this, complete package data having a quality by no means inferior to the original material can be generated.

As mentioned above by using the first to third embodiments, according to the data processing system of the present embodiment, when processing accompanied by a deterioration of quality of the material data such as processing and recording is carried out, the generation data GEN_N embedded in the material data can be automatically updated.

Therefore, the user handling the material data can easily determine the quality of the material data to be handled based on the generation data GEN_N and can use this for the editing work of the material data.

Namely, whether the material data is the original material data or intermediate material data can be easily identified by detecting the generation data GEN_N embedded in the material data. A case where the generation data GEN_N indicates the 0 generation indicates that the material data is the original material data, while the other case indicates that the material data is intermediate material data. Further, the generation data GEN_N itself indicates the degree of separation from the original material, so it becomes a standard for deciding the quality of the material data.

Further, in the present embodiment, the generation data GEN_N is embedded in the material data using the electronic watermark technique or the like, so the quality of the material data will not be deteriorated much at all.

Further, according to the data processing system of the present embodiment, by not burying the entire processing history data in the material data, but by burying only the generation data in the material data, the generation data can be stored in the UMID data used as the standard, and it is not necessary to prescribe a special format.

The present invention is not limited to the above embodiments.

In the above embodiments, as the processing means of the present invention, the telop insertion unit 20 and the switcher 21 were exemplified, but the processing means is not particularly limited so far as it can process and output input material data without recording accompanied by a deterioration of quality.

Further, if the quality of the material data is deteriorated due to the processing by the processing means, it is also possible for the processing means (CPU) to update the generation data GEN_N of the material data generated by the processing.

As explained above, according to the present invention, the data processing apparatus able to easily identify how many times content data was subjected to processing accompanied by a deterioration of quality in the past from the content data itself and a method of the same and a program of the same can be provided.

Further, according to the present invention, when the processing history data indicating the history of content of the processing applied to the content data in the past is managed separately from the content data, a data processing apparatus able to avoid useless reference to the processing history data and a method of the same and program of the same can be provided.

INDUSTRIAL APPLICABILITY

The present invention can be applied to a data processing apparatus wherein it is necessary to identify the number of times content data to be processed was subjected to processing accompanied by a deterioration of quality in the past and a method of the same and a program of the same.

LIST OF REFERENCES 1, 101, 201 . . . data processing system
2 . . . camera
3 . . . data processing apparatus
4 . . . internal bus
5 . . . interface
6 . . . operation unit
7 . . . display unit
8 . . . database
9 . . . database
10 . . . UMID extracting/embedding unit
11 . . . CPU
20 . . . telop insertion unit
21 . . . switcher

The invention claimed is:

1. A data processing apparatus comprising:
an extracting means for extracting, from content data, generation data added to the content data, wherein the generation data is part of unique material identifier (UMID) data indicating a number of times encoding processing has been previously applied to the content data and is a new value in a field of an instance number in the UMID data;
a processing means for updating said number indicated by said extracted generation data to generate new generation data when applying an encoding processing and adding the new generation data to said content data; and
a storage means for storing processing history data showing the history of the encoding processing applied to said content data in previous encoding processing.

2. A data processing apparatus as set forth in claim 1, wherein said processing means updates the extracted generation data to generate new generation data and adds the new generation data to said content data when encoding said content data.

3. A data processing apparatus as set forth in claim 2, wherein said processing means adds said new generation data to said content data, then encodes the content data to which the new generation data was added and writes the encoded content data into a recording medium.

4. A data processing apparatus as set forth in claim 1, wherein said processing means adds generation data showing an initial value to said UMID data embedded in the content data when the encoding processing has not been previously applied to said content data.

5. A data processing apparatus as set forth in claim 1, wherein said apparatus wherein said processing means refers to the corresponding processing history data stored in said storage means when deciding the encoding processing previously applied to said content data based on said extracted generation data.

6. A data processing apparatus as set forth in claim 5, wherein said processing means displays said referenced processing history data.

7. A data processing apparatus as set forth in claim 5, wherein said processing means processes said content data based on the processing history data.

8. A data processing apparatus as set forth in claim 1, wherein said apparatus further comprises a storage means for storing processing history data showing a history of processing previously performed on said content data and said processing means processes said content data without reference to said processing history data when said extracted generation data shows said initial value.

9. A data processing apparatus as set forth in claim 1, wherein said processing means generates said generation data showing a generation data increased by one from the generation data shown by said extracted generation data and outputs said generated generation data to said content data when performing encoding processing.

10. A data processing apparatus as set forth in claim 1, wherein said apparatus further comprises a second processing means for encoding processing input content data and outputting said encoded processed content data without recording, which is accompanied by a deterioration of quality and said processing means performs encoding processing using said content data in cooperation with said second processing means.

11. A data processing apparatus as set forth in claim 1, wherein said processing means adds said generation data to said content data as part of identification data for identifying said content data.

12. A data processing method performed by a data processing apparatus, comprising:
    extracting generation data embedded in content data, wherein the generation data is part of unique material identifier (UMID) data indicating a number of times encoding processing has been previously applied to the content data and is a new value in a field of an instance number in the UMID data;
    storing processing history data showing the history of the encoding processing applied to said content data in previous encoding processing;
    updating said number indicated by the extracted generation data to generate new generation data when encoding processing is applied to said content data; and
    adding said new generation data to said UMID data embedded in the content data.

13. A data processing method as set forth in claim 12, wherein said extracted generation data is updated to generate new generation data and adds the new generation data to said content data when encoding said content data.

14. A data processing method as set forth in claim 12, further comprising:
    after adding said new generation data to said UMID data embedded in the content data, then encoding the content data to which the new generation data was added and writing the encoded content data into a recording medium.

15. A data processing method as set forth in claim 12, further comprising:
    adding generation data showing an initial value to said UMID data embedded in the content data when encoding processing has not been previously applied to said content data.

16. A data processing method as set forth in claim 12, further comprising, when judging that said content data been previously subjected to encoding processing, which is accompanied by a deterioration of quality based on said extracted generation data extracted, referring to processing history data showing a history of the encoding processing previously performed on said content data.

17. A computer-readable storage medium having recorded thereon a program that when executed by a data processing apparatus performs a method comprising:
    extracting generation data embedded in content data, wherein the generation data is part of unique material identifier (UMID) data indicating a number of times encoding processing has been previously applied to the content data and is a new value in a field of an instance number in the UMID data;
    storing processing history data showing the history of the encoding processing applied to said content data in previous encoding processing;
    updating the number indicated by the extracted generation data to generate new generation data when encoding processing is applied to said content data; and
    adding said new generation data to said UMID data embedded in the content data.

18. The storage medium as set forth in claim 17, wherein said extracted generation data is updated to generate new generation data and adds the new generation data to said content data when encoding said content data.

19. The storage medium as set forth in claim 18, further comprising after adding said new generation data to said UMID data embedded in the content data, then encoding the content data to which the new generation data was added and writing the encoded content data into a recording medium.

* * * * *